(12) United States Patent
Tatematsu et al.

(10) Patent No.: US 8,389,151 B2
(45) Date of Patent: Mar. 5, 2013

(54) BATTERY UNIT

(75) Inventors: Kazutaka Tatematsu, Nagoya (JP); Ryoji Mizutani, Nishikamo-gun (JP); Eiji Yamada, Owariasahi (JP); Yasuhiro Endo, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 564 days.

(21) Appl. No.: 12/513,284

(22) PCT Filed: Mar. 7, 2008

(86) PCT No.: PCT/JP2008/054699
§ 371 (c)(1),
(2), (4) Date: May 1, 2009

(87) PCT Pub. No.: WO2008/108507
PCT Pub. Date: Sep. 12, 2008

(65) Prior Publication Data
US 2010/0075218 A1 Mar. 25, 2010

(30) Foreign Application Priority Data
Mar. 8, 2007 (JP) ................................ 2007-058663

(51) Int. Cl.
*H01M 2/00* (2006.01)
*H01M 2/02* (2006.01)
*H01M 2/26* (2006.01)
*H01M 6/00* (2006.01)
*H01M 10/00* (2006.01)

(52) U.S. Cl. ........ 429/148; 429/122; 429/161; 429/163; 429/170

(58) Field of Classification Search .................. 429/122, 429/148, 161, 163, 170
See application file for complete search history.

(56) References Cited

U.S. PATENT DOCUMENTS
2006/0228919 A1   10/2006   Marukawa et al.

FOREIGN PATENT DOCUMENTS

| EP | 1 424 744 A1 | | 6/2004 |
|---|---|---|---|
| JP | 06-052953 A | | 2/1994 |
| JP | 2002-343331 | * | 11/2002 |
| JP | 2002-343331 A | | 11/2002 |
| JP | 2003-346748 A | | 12/2003 |
| JP | 2004-007919 A | | 1/2004 |
| JP | 2004-007920 A | | 1/2004 |
| JP | 2004-134210 A | | 4/2004 |
| JP | 2006-294425 A | | 10/2006 |

OTHER PUBLICATIONS
Translation of German Office Action, Mar. 4, 2011.

* cited by examiner

*Primary Examiner* — Barbara Gilliam
*Assistant Examiner* — Steven Scully
(74) *Attorney, Agent, or Firm* — Kenyon & Kenyon LLP (57) ABSTRACT

A battery unit includes a casing, bipolar batteries as a plurality of stacked type batteries housed in the casing, and a plug. The bipolar battery is formed by stacking a plurality of battery elements each having sheet electrodes on opposite sides of an electrolyte, and has collectors. The plug is detachably inserted between the bipolar batteries, and electrically connects bipolar batteries.

5 Claims, 4 Drawing Sheets

BATTERY UNIT

This is a 371 national phase application of PCT/JP2008/054699 filed 07 Mar. 2008, claiming priority to Japanese Patent Application No. 2007-058663 filed 08 Mar. 2007, the contents of which are incorporated herein by reference.

TECHNICAL FIELD

The present invention relates to a battery unit (battery assembly) formed by stacking a plurality of stacked type secondary batteries such as bipolar batteries.

BACKGROUND ART

Conventionally, stacked type secondary batteries having sheet-type electrodes stacked with an electrolyte layer interposed, and battery units formed by connecting a plurality of such stacked type secondary batteries have been known. Japanese Patent Laying-Open No. 2004-134210 describes examples of such stacked type secondary battery and battery unit.

Among the battery units described above, some are provided with a safety plug that can physically cut-off a current path. Japanese Patent Laying-Open No. 2003-346748 describes an example of the safety plug. Japanese Patent Laying-Open Nos. 2002-343331, 2004-007919 and 2004-007920 describe safety plugs for vehicle batteries.

DISCLOSURE OF THE INVENTION

From a practical viewpoint, a safety plug is considered necessary for a battery unit formed by connecting a plurality of stacked type secondary batteries. It is difficult, however, to directly connect the safety plug and the electrode, as the sheet-type electrode is thin.

Therefore, in a battery assembly unit described in Japanese Patent Laying-Open No. 2003-346748, first and second wires connected to left and right battery cell groups are separately provided, and wire ends are connected by a safety plug.

This approach, however, requires separate wires for the safety plug and, in addition, it requires a space for arranging the wires. As a result, the battery unit is equivalently increased in size. Further, it becomes necessary to provide a connecting portion between the safety plug and the wires and, depending on arrangement of other elements or components, various problems such as difficulty in wire routing possibly arise.

The present invention was made to solve the above-described problems and its object is to provide a compact battery unit (battery assembly) having a plug that can disconnect/connect a current path inside the battery.

The present invention provides a battery unit (battery assembly), including: a casing; first and second stacked type batteries formed by stacking a plurality of battery elements having sheet electrodes on opposite sides of an electrolyte, housed in the casing; and a plug detachably inserted between the first and second stacked type batteries, enabling electrical connection of the first and second stacked type batteries to each other.

Preferably, a conductive and elastically deformable connecting member is provided between the plug and the first and second stacked type batteries. In that case, the plug is electrically connected to the first and second stacked type batteries, through the connecting member.

Preferably, the casing has a recess that can receive the plug, between the first and second stacked type batteries. In that case, at least part of the connecting member is exposed in the recess, and electrical connection is established by bringing the plug into contact with the connecting member when the plug is inserted to the recess.

The first stacked type battery may have a first conductive and elastically deformable connecting member between itself and the second stacked type battery, and the second stacked type battery may have a second conductive and elastically deformable connecting member between itself and the first stacked type battery. In that case, the first and second connecting members may pinch the plug when the plug is inserted between the first and second stacked type batteries, whereby the plug and the first and second stacked type batteries are electrically connected.

Preferably, the casing has a recess that can receive the plug between the first and second stacked type batteries. In that case, at least part of the first and second connecting portions is exposed in the recess, and the plug may be brought into contact with the first and second connecting members when the plug is inserted to the recess.

The plug may have a fuse portion and first and second conductive portions connected via the fuse portion. In that case, when the plug is inserted between the first and second stacked type batteries, the first conductive portion may be electrically connected to the first stacked type battery and the second conductive portion may be electrically connected to the second stacked type battery.

The first and second stacked type batteries are, by way of example, bipolar batteries. Combinations of each of the components described above are also naturally intended.

The battery unit (battery assembly) in accordance with the present invention, having such a plug as described above, allows electrical connection between the first and second stacked type batteries simply by inserting the plug between the first and second stacked type batteries and allows electrical insulation between the first and second stacked type batteries by removing the plug from between the first and second stacked type batteries. In other words, the connecting portion between the plug and the first and second stacked type batteries can be placed between the first and second stacked type batteries. Therefore, it becomes unnecessary to draw wires for connecting the plug to the first and second stacked type batteries to the periphery of the batteries and, therefore, conventionally required elements such as the wires and the space become unnecessary. As a result, the battery unit can be made compact.

BEST MODES FOR CARRYING OUT THE INVENTION

In the following, an embodiment of the present invention will be described with reference to FIGS. 1 to 7. In the figures, the same or corresponding portions are denoted by the same reference characters and accumulative description thereof will not be repeated. Not every component of the embodiment is indispensable, and some of the components may be omitted.

Figure 1:
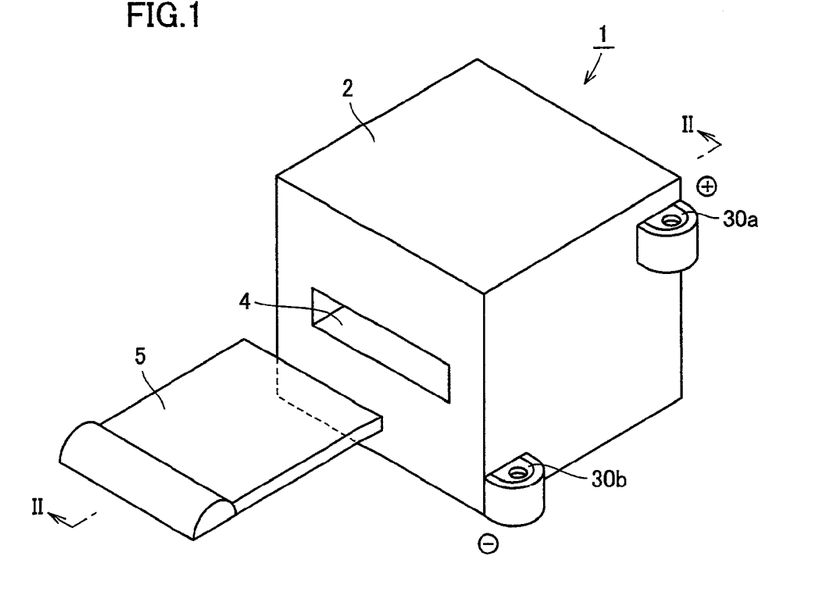
FIG. 1 is a perspective view showing a battery unit in accordance with an embodiment of the present invention

FIG. 1 shows a battery unit (battery assembly) 1 in accordance with an embodiment of the present invention. As shown in FIG. 1, battery unit 1 includes a casing (coated layer: housing) 2 having a recess 4 and typically formed of an insulating material such as resin, a plurality of terminal portions 30a, 30b protruded from casing 2, and a plug 5.

In the example shown in FIG. 1, terminal portion 30a is a positive electrode terminal and terminal portion 30b is a negative electrode terminal. Though terminal potions 30a and 30b protrude in the same direction, they may protrude in opposite directions or in arbitrary directions as needed. Preferably, however, terminal portions 30a and 30b should be arranged not to overlap one above the other. Through these terminal portions, a current discharged from battery unit 1 can be supplied to the outside, and at the time of charging, a current can be supplied from the outside to battery unit 1.

Recess 4 is opened on a surface of casing 2, and has such a size that can receive at least part of the plug 5. Though it has an approximately rectangular opening in the example shown in FIG. 1, the opening of recess 4 may have arbitrary shape as long as it can receive plug 5. The depth of recess 4 can also be set arbitrarily, provided that it can receive plug 5 and attain its function. It may be deep enough to fully receive plug 6, or part of plug 5 may protrude from the surface of casing 2 when plug 5 is inserted.

Figure 2:
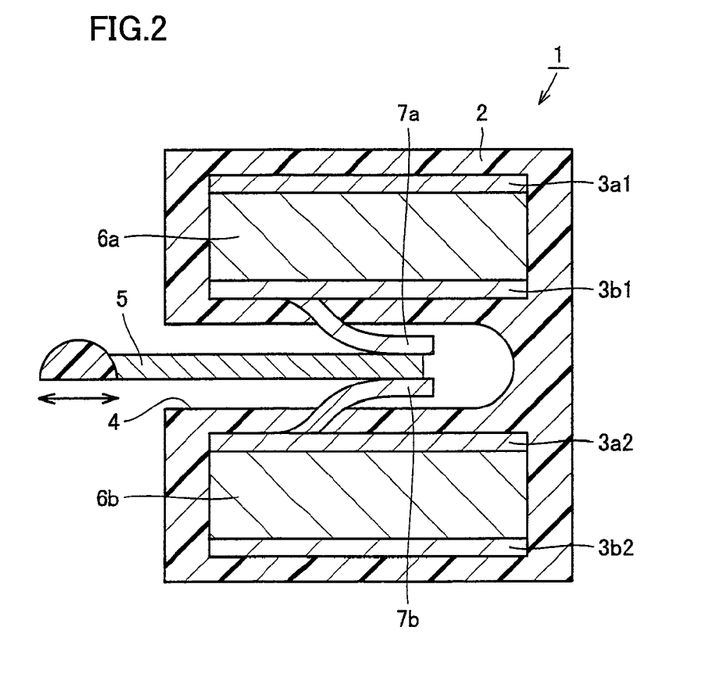
FIG. 2 is a cross-sectional view showing an exemplary structure taken along the line II-II of FIG. 1.
Figure 3:
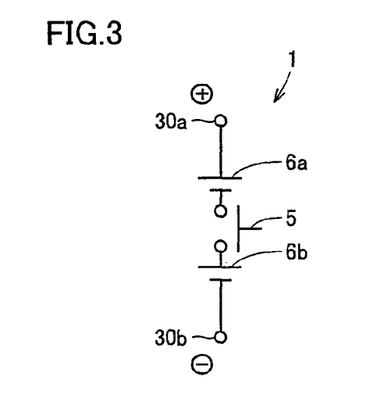
FIG. 3 is an equivalent circuit diagram of the battery unit shown in FIG. 1.

FIG. 2 shows an exemplary sectional structure taken along the line of FIG. 1, and FIG. 3 is an equivalent circuit diagram of battery unit 1.

As shown in FIGS. 2 and 3, battery unit 1 is a battery assembly including a plurality of bipolar batteries (stacked type batteries) 6a and 6b as secondary batteries, and between bipolar batteries 6a and 6b, plug 5, which can function as a safety plug, is detachably attached. In the example of FIG. 2, two bipolar batteries 6a and 6b are stacked one above the other. The number of bipolar batteries 6a and 6b, however, can arbitrarily be selected.

Bipolar batteries 6a and 6b include collectors (collector electrodes) 3a1, 3b1, 3a2 and 3b2, respectively, and in the example of FIGS. 1 and 2, tip end portions of collectors 3a1 and 3b2 serve as terminal portions 30a and 30b, respectively. Though collectors 3a1, 3b1, 3a2 and 3b2 can typically be formed by plate-shaped conductive members, collectors of other shapes may also be used. In the example shown in FIGS. 1 and 2, collectors 3a1 and 3a2 function as positive collector electrodes, and collectors 3b1 and 3b2 function as negative collector electrodes.

Figure 4:
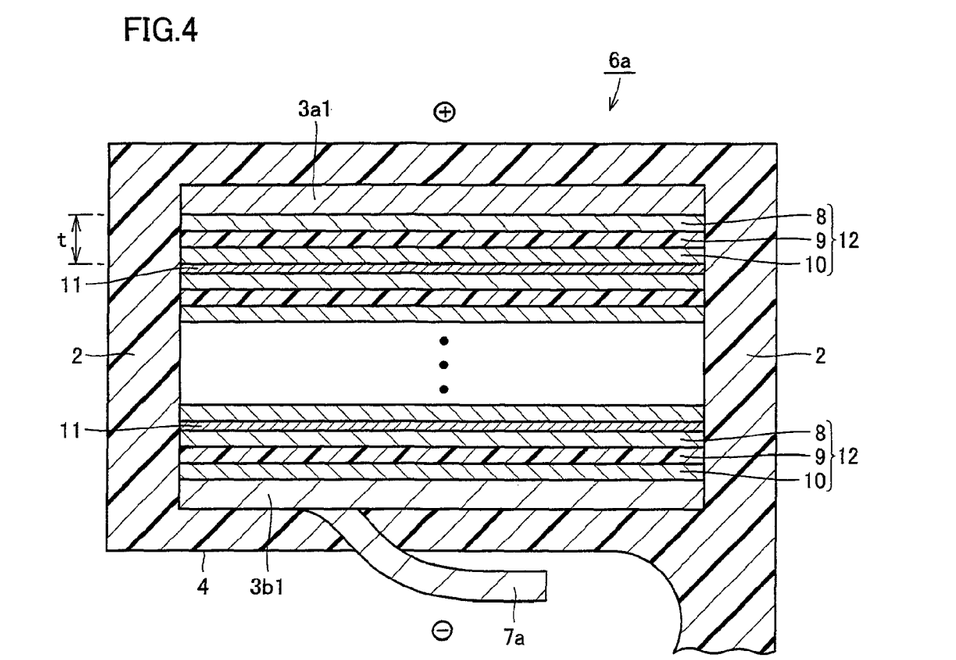
FIG. 4 is a cross-sectional view showing an exemplary structure of a bipolar battery.

Referring to FIG. 4, an exemplary structure of a bipolar battery will be described. Bipolar batteries 6a and 6b basically have the same structure and, therefore, only the exemplary structure of bipolar battery 6a will be described.

In the example of FIG. 4, bipolar battery 6a is formed by stacking a plurality of unit battery cells (battery elements: electrolyte, and cathode and anode arranged on opposite sides thereof) 12 and a collector foil (collector) 11 arranged between each of the unit battery cells 12. At an upper and lower ends of bipolar battery 6a, collectors 3a1 and 3b1 described above, formed to be thicker than collector 11 and having plate-shape are placed.

Unit battery cell 12 includes a plate-shaped electrolyte layer 9, a cathode active material layer 8 formed on one main surface of electrolyte layer 9, and an anode active material layer 10 formed on the other main surface of electrolyte layer 9. Thickness t of one unit battery cell 12 is, for example about tens of μm. Unit battery cells 12 are connected in series with collector foil 11 inserted between each other.

Next, examples of materials forming each of the elements of bipolar battery 6a will be described. Collector foil 11 mentioned above may be formed, by way of example, of aluminum. Here, even if the active material layer provided on the surface of collector foil 11 contains solid polymer electrolyte, it is possible to ensure sufficient mechanical strength of collector foil 11. Collector foil 11 may be formed by providing aluminum coating on metal other than aluminum, such as copper, titanium, nickel, stainless steel (SUS) or an alloy of these.

Anode active material layer 10 includes a solid polymer electrolyte. Anode active material layer 10 may contain a supporting electrolyte (lithium salt) for improving ion conductivity, a conduction assistant for improving electron conductivity, NMP (N-methyl-2-pyrolidone) as a solvent for adjusting slurry viscosity, AIBN (azobisisobutyronitrile) as a polymerization initiator or the like.

As the anode active material 10, composite oxide of lithium and transition metal generally used in a lithium ion secondary battery may be used. Further, as the anode active material layer 10, Li/Co based composite oxide such as $LiCoO_2$, Li/Ni based composite oxide such as $LiNiO_2$, Li/Mn based composite oxide such as spinel $LiMn_2O_4$, and Li/Fe based composite material such as $LiFeO_2$ may be used. Besides, sulfated compound or phosphate compound of lithium and transition metal such as $LiFePo_4$; sulfide or oxide of transition metal such as $V_2O_5$, $MnO_2$, $TiS_2$, $MoS_2$ and $MoO_3$; $PbO_2$, AgO, NiOOH and the like may be used.

The solid polymer electrolyte is not specifically limited and it may be any ion-conducting polymer. For example, polyethylene oxide (PEO), polypropylene oxide (PPO) or copolymer of these may be available. Such a polyalkylene oxide based polymer easily dissolves lithium salt such as $LiBF_4$, $LiPF_6$, $LiN(SO_2CF_3)_2$, or $LiN(SO_2C_2F_5)_2$. The solid polymer electrolyte is included in at least one of anode active material layer 10 and cathode active material layer 8. More preferably, the solid polymer electrolyte is included both in anode active material layer 10 and cathode active material layer 8.

As the supporting electrolyte, $Li(C_2F_5SO_2)_2N$, $LiBF_4$, $LiPF_6$, $LiN(SO_2C_2F_5)_2$ or a mixture of these may be used. As the electron conduction assistant, acethylene black, carbon black, graphite or the like may be used.

Cathode active material layer 8 includes a solid polymer electrolyte. Cathode active material layer 8 also may contain a supporting electrolyte (lithium salt) for improving ion conductivity, a conduction assistant for improving electron conductivity, NMP (N-methyl-2-pyrolidone) as a solvent for adjusting slurry viscosity, AIBN (azobisisobutyronitrile) as a polymerization initiator or the like.

As the cathode active material layer 8 also, a material generally used in a lithium ion secondary battery may be used. If a solid electrolyte is used, it is preferred to use a composite oxide of carbon or lithium and metal oxide or metal, as the cathode active material layer 8. More preferably, the cathode active material layer 8 is formed of a composite oxide of carbon or lithium and transition metal. An example of transition metal is titanium.

As the solid electrolyte forming electrolyte layer 9, by way of example, a solid polymer electrolyte such as polyethylene oxide (PEO), polypropylene oxide (PPO) or copolymer of these may be used. The solid electrolyte contains supporting electrolyte (lithium salt) for ensuring ion conductivity. As the supporting salt, $LiBF_4$, $LiN(SO_2CF_3)_2$, $LiN(SO_2C_2F_5)_2$ or a mixture of these may be used.

Tables 1 to 3 below show specific examples of materials that can form anode active material layer 10 (anode material), materials that can form cathode active material layer 8 (cathode material) and materials that can form electrolyte layer 9 (solid electrolyte or polymer base).

Table 1 shows specific examples when electrolyte layer 9 is of an organic solid electrolyte, Table 2 shows specific examples when electrolyte layer 9 is of an inorganic solid electrolyte, and Table 3 shows specific examples when electrolyte layer 9 is of a gel electrolyte.

TABLE 1

| Cathode material | Anode material | Solid electrolyte | Remarks |
|---|---|---|---|
| $LiMn_2O_4$ | Li metal | P(EO/MEEGE) | electrolyte salt: $LiBF_4$ |
| — | Li metal | P(EO/PEG-22) | electrolyte salt: $LiN(CF_3SO_2)_2$(LiTFSI) |
| $LiCoO_2$ | carbon | PVdF base | — |
| $LiCoO_2$ | Li metal | ether based polymer P(EO/EM/AGE) | electrolyte salt: LiTFSI<br>ion conducting material binder: mix P(EO/EM) + $LiBF_4$ to cathode |
| $Li_{0.33}MnO_2$ | Li metal | P(EO/EM/AGE) | electrolyte salt: LiTFSI<br>ion conducting material binder: mix PEO-based solid polymer + LiTFSI to cathode |
| $Li_{0.33}MnO_2$ | Li metal | PEO base + inorganic additive | electrolyte salt: $LiClO_4$<br>ion conducting material: mix KB + PEG + LiTFSI to cathode |
| — | — | PEG-PMMA + PEG-borate ester | electrolyte salt: LiTFSI, BGBLi |
| — | — | PEO base + 10 mass %$0.6Li_2S + 0.4SiS_2$ | electrolyte salt: $LiCF_3SO_3$ |
| — | Li metal | PEO base + perovskite type $La_{0.55}Li_{0.35}TiO_3$ | electrolyte salt: $LiCF_3SO_3$ |
| Li metal | — | styrene/ethylene oxide-block-graft polymer(PSEO) | electrolyte salt: LiTFSI<br>ion conducting material: mix KB + PVdF + PEG + LiTFSI to cathode |
| $LiCoO_2$ | Li metal | P(DMS/EO) + polyether cross link | — |
| $Li_{0.33}MnO_2$ | Li metal | prepolymer composition mainly consisting of urethane acrylate (PUA) | electrolyte salt: LiTFSI<br>ion conducting material: mix KB + PVdF + PEG + LiTFSI to cathode |
| — | — | multibranched graft polymer (MMA + CMA + POEM) | electrolyte salt: $LiClO_4$ |
| $LiNi_{0.8}Co_{0.2}O_2$ | Li metal | PEO/multibranched polymer/filler based composite solid electrolyte (PEO + HBP + $BaTiO_3$) | electrolyte salt: LiTFSI<br>mix SPE + AB to cathode |
| — | — | PME400 + 13group metal alkoxide (as Lewis acid) | electrolyte salt: LiCl |
| — | — | matrix containing poly (N-methylvinylimidazoline) (PNMVI) | electrolyte salt: $LiClO_4$ |
| $LiCoO_2$ | Li metal | polymerize methoxy polyethylene glycol monomethyl meso acrylate using ruthenium complex by living radical polymerization, further polymerize with styrene | electrolyte salt: $LiClO_4$<br>cathode conducting material KB + binder PVdF |
| $LiCoO_2$ | Li metal | P(EO/EM) + ether based plasticizer | electrolyte salt: LiTFSI<br>cathode conducting material KB + binder PVdF |

TABLE 2

| Cathode material | Anode material | Solid Electrolyte | Remarks |
|---|---|---|---|
| $LiCoO_2$ | In | $95(0.6Li_2S \cdot 0.4SiS_2) \cdot 5Li_4SiO_4$<br>($Li_2S$—$SiS_2$ based melt rapid cooled glass) | state: glass |
| — | — | $70Li_2S \cdot 30P_2S_5Li_{1.4}P_{0.6}S_{2.2}$ sulfide glass<br>($Li_2S$—$P_2S_5$ based glass ceramics) | state: glass<br>forming method: mechanochemical |
| — | — | $Li_{0.35}La_{0.55}TiO_3$(LLT)<br>(perovskite type structure) | state: ceramics<br>form solid electrolyte porous body, fill pores with active material sol |
| — | — | $80Li_2S \cdot 20P_2S_5$<br>($Li_2S$—$P_2S_5$ based glass ceramics) | state: glass<br>forming method: mechanochemical |
| — | — | $xSrTiO_3 \cdot (1-x)LiTaO_3$<br>(perovskite type oxide) | state: ceramics |
| $LiCoO_2$ | Li—In metal | $Li_{3.4}Si_{0.4}P_{0.6}S_4$<br>(thio-LISICON Li ion conductor) | state: ceramics |
| — | — | $(Li_{0.1}La_{0.3})_xZr_yNb_{1-y}O_3$<br>(perovskite type oxide) | state: ceramics |
| — | — | $Li_4B_7O_{12}Cl$ | state: ceramics<br>combine PEG as organic compound |
| — | — | $Li_4GeS_4$—$Li_3PS_4$ based crystal $Li_{3.25}Ge_{0.25}P_{0.75}S_4$<br>(thio-LISICON Li ion conductor) | state: ceramics |
| — | Li metal<br>In metal | $0.01Li_3PO_4$—$0.63Li_2S$—$0.36SiS_2$<br>(thio-LISICON Li ion conductor) | state: ceramics |
| $LiCoO_2$ $LiFePO_4$<br>$LiMn_{0.6}Fe_{0.4}PO_4$ | Li metal<br>$V_2O_5$ | $Li_3PO_{4-x}N_x$(LIPON)<br>(lithium phosphate oxinitride glass) | state: glass |
| $LiNi_{0.8}Co_{0.15}Al_{0.05}O_2$ | Li metal | $Li_3InBr_3Cl_3$<br>(rock salt type Li ion conductor) | state: ceramics |
| — | — | $70Li_2S \cdot (30-x)P_2S_5 \cdot xP_2O_5$<br>($Li_2S$—$P_2S_5$—$P_2O_5$ based glass ceramics) | state: glass |

TABLE 2-continued

| Cathode material | Anode material | Solid Electrolyte | Remarks |
|---|---|---|---|
| $LiCoO_2$ etc. | Li metal Sn based oxide | $Li_2O$—$B_2O_3$—$P_2O_5$ base, $Li_2O$—$V_2O_5$—$SiO_2$ base, $Li_2O$—$TiO_2$—$P_2O_5$ base, LVSO etc. | state: glass |
| — | — | $LiTi_2(PO_3)_4$ (LTP) (NASICON type structure) | state: ceramics |

TABLE 3

| Cathode material | Anode material | Polymer base | Remarks |
|---|---|---|---|
| Ni based collector | Li metal | acrylonitrile vinyl acetate (PAN-VAc based gel electrolyte) | solvent: EC + PC<br>electrolyte salt: $LiBF_4$, $LiPF_6$, $LiN(CF_3SO_2)_2$ |
| lithium electrode | lithium electrode | triethylene glycolmethyl methacrylate (polymethyl methacrylate (PMMA) based gel electrolyte) | solvent: EC + PC<br>electrolyte salt: $LiBF_4$ |
| $V_2O_5$/PPy composite body | Li metal | methyl methacrylate (PMMA gel electrolyte) | solvent: EC + DEC<br>electrolyte salt: $LiClO_4$ |
| Li metal | Li metal | PEO/PS polymer blend gel electrolyte | solvent: EC + PC<br>electrolyte salt: $LiClO_4$ |
| Li metal | Li metal | alkylene oxide based polymer electrolyte | solvent: PC<br>electrolyte salt: $LiClO_4$ |
| Li metal & $LiCoO_2$ | Li metal | alkylene oxide based polymer electrolyte | solvent: EC + GBL<br>electrolyte salt: $LiBF_4$ |
| Li metal | Li metal | polyolefin based base polymer | solvent: EC + PC<br>electrolyte salt: $LiBF_4$ |
| $Li_{0.36}CoO_2$ | Li metal | polyvinylidenefluoride (PVdF) + propylene hexafluoride (HFP) (PVdF-HFP gel electrolyte) | solvent: EC + DMC<br>electrolyte salt: $LiN(CF_3SO_2)_2$ |
| $LiCoO_2$ | Li metal | PEO based and aclyl based polymer | solvent: EC + PC<br>electrolyte salt: $LiBF_4$ |
| Li metal | Li metal | trimethylol propane ethoxylate acrylate (ether based polymer) | solvent: PC<br>electrolyte salt: LiBETI, $LiBF_4$, $LiPF_6$ |
| — | — | EO-PO copolymer | electrolyte salt: LiTFSI, $LiBF_4$, $LiPF_6$ |
| — | — | poly aziridine compound | solvent: EC + DEC<br>electrolyte salt: $LIPF_6$ |
| — | PAS (polyacene) | PVdF-HFP gel electrolyte | solvent: PC, EC + DEC<br>electrolyte salt: $LiClO_4$, $Li(C_2F_5SO_2)_2N$ |
| — | — | urea based lithium polymer gel electrolyte | solvent: EC + DMC<br>electrolyte salt: $LiPF_6$ |
| — | — | polyether/polyurethane based (PEO-NCO) gel electrolyte | solvent: PC<br>electrolyte salt: $LiClO_4$ |
| — | — | cross-linked polyalkylene oxide based gel polymer electrolyte | — |

Again referring to FIG. 2, casing 2 is provided to cover side surfaces and upper and lower surfaces of bipolar batteries 6a and 6b, and typically formed of an insulating material (insulating layer). Specifically, casing 2 may be formed of an insulating material such as resin. Casing 2, however, may be formed of an insulating material other than resin. Further, bipolar batteries 6a and 6b may be covered by casing 2 formed of a single layer or a plurality of layers of insulating material or materials.

In the example shown in FIG. 2, casing 2 has recess 4 at the central portion in the height direction. The position of forming recess 4, however, may be arbitrarily selected. Further, the number of recesses 4 is not limited to one and arbitrary number may be set in accordance with the number of plugs 5. Recess 4 shown in FIG. 2 is formed as a dent in casing 2 at a position between bipolar batteries 6a and 6b, and extends in a direction substantially parallel to the electrodes of bipolar batteries 6a and 6b.

Bipolar battery 6a has a connecting member (connecting portion) 7a, and bipolar battery 6b has a connecting member (connecting portion) 7b. Connecting members 7a and 7b are provided between bipolar batteries 6a and 6b.

Connecting member 7a is formed of a conductive member of metal or the like, and electrically connected to collector 3b1 as an electrode of bipolar battery 6a positioned closest to bipolar battery 6b. Similar to connecting member 7a, connecting member 7b is formed of a conductive member of metal or the like, and electrically connected to collector 3a2 as an electrode of bipolar battery 6b positioned closest to bipolar battery 6a. In the example shown in FIG. 2, connecting members 7a and 7b are provided opposite to each other, between bipolar batteries 6a and 6b.

Figure 5A:
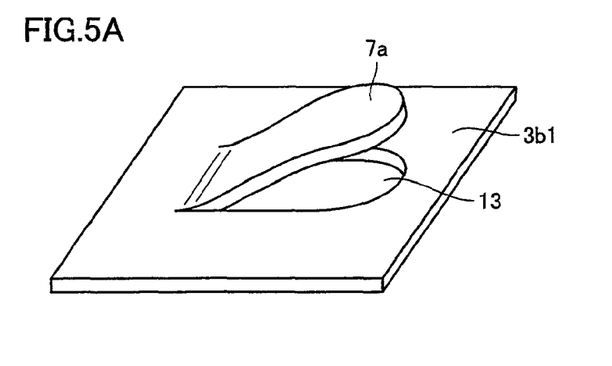
FIGS. 5A and 5B are perspective views showing exemplary shapes of the connecting member.
Figure 5B:
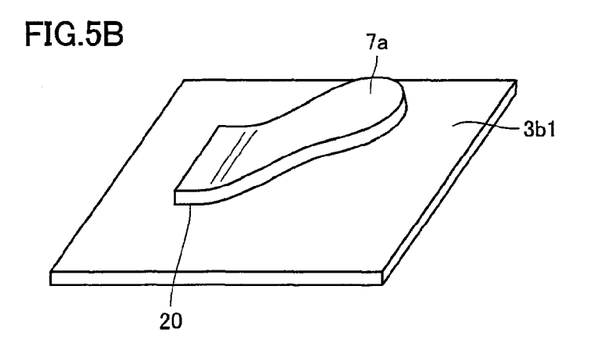

Connecting member 7a may be formed integral with collector 3b1 by deforming and raising a part of collector 3b1 by press working, for example, as shown in FIG. 5A, or it may be formed as a separate member and joined to collector 3b1 by welding or brazing as shown in FIG. 5B. Connecting member 7b may be formed by the same method.

In the example shown in FIG. 5A, a through hole 13 is formed in collector 3b1 positioned immediately below connecting member 7a, whereas in the example of FIG. 5B, no through hole exists in collector 3b1 positioned immediately below connecting member 7a, as connecting member 7a is formed by joining a separate member to collector 3b1 at joint portion 20. The same applies to connecting member 7b.

Connecting member 7a, 7b may be formed of a single conductive member, or connecting member 7a, 7b may be formed by combining a plurality of members. Further, connecting members 7a and 7b have the function of electrically connecting bipolar batteries 6a, 6b and plug 5 and, in order to effectively attain the function, it is desirable that these members are firmly in contact with plug 5 when plug 5 is inserted to recess 4.

By way of example, adoption of a structure that can apply elastic force to plug 5 is desirable, so that plug 5 and connecting members 7a and 7b are in contact with a certain force or more acting therebetween when plug 5 is inserted to recess 4. More specifically, connecting members 7a and 7b may be arranged at positions where plug 5 touches part of connecting members 7a and 7b when plug 5 is inserted to recess 4, and connecting members 7a and 7b may be elastically deformed by the insertion of plug 5, so that elastic force acts on plug 5. In other words, connecting members 7a and 7b may have a function of cantilevered plate spring.

In the example shown in FIG. 2, connecting members 7a and 7b are bent rising from the main surface of collectors 3b1 and 3a2 diagonally to the side of bipolar battery 6b, and when plug 5 is inserted to recess 4, connecting members 7a and 7b are elastically deformed. Any other structure may be adopted to apply elastic force to plug 5. Contrary to the above, a structure corresponding to connecting members 7a and 7b described above may be provided on the side of plug 5 and brought into contact with collectors 3b1 and 3a2, so that elastic force may be applied from plug 5 to collectors 3b1 and 3a2 (to the side of bipolar batteries). In the example of FIG. 2, connecting members 7a and 7b extend in the direction of inserting plug 5. This enables smooth insertion of plug 5 to recess 4, and plug 5 can easily be inserted to recess 4.

As shown in FIG. 2, connecting members 7a and 7b have flat portions extending in a direction substantially parallel to collectors 3b1 and 3a2, that is, portions extending in a direction substantially parallel to plug 5 when plug 5 is inserted to recess 4. Provision of such portions ensures sufficient contact area between plug 5 and connecting members 7a and 7b. In the example of FIG. 2, connecting portions 7a and 7b are curved to form substantially flat portions. It is also possible to bend the tip end portion or a portion close to the tip end of connecting members 7a and 7b to provide the flat portions.

Surfaces of connecting members 7a and 7b are partially exposed in recess 4 as shown in FIG. 2. Therefore, when plug 5 is inserted to recess 4, plug 5 can easily be brought into contact with connecting members 7a and 7b. In the example shown in FIG. 2, tip ends of connecting members 7a and 7b are free ends apart from casing 2. Tip ends of connecting members 7a and 7b may be fixed to casing 2, for example, by embedding the tip ends in casing 2. By fixing tip ends of connecting members 7a and 7b, unnecessary contact between connecting members 7a and 7b at opposite positions can be avoided.

By providing connecting portions 7a and 7b at positions opposite to each other as shown in FIG. 2, it becomes possible to pinch plug 5 by connecting members 7a and 7b, when plug 5 is inserted to recess 4. Therefore, connecting members 7a and 7b are in contact with plug 5 while elastic force is applied by both connecting members 7a and 7b to plug 5, and hence connecting members 7a and 7b and plug 5 are firmly in contact with each other.

Though connecting portions 7a and 7b have the same shape in the example of FIG. 2, these may have different shapes. Further, though connecting members 7a and 7b are provided at portions overlapping with each other in the vertical direction of FIG. 2, the positions of forming connecting members 7a and 7b may be changed appropriately. By way of example, positions of forming connecting members 7a and 7b may be shifted in the left/right direction of FIG. 2 (direction parallel to the direction of extension of collectors 3b1 and 3a2). When connecting members 7a and 7b are provided overlapped in the vertical direction of FIG. 2, it is possible to bring connecting members 7a and 7b into contact with upper and lower surfaces of plug 5 such that part of plug 5 is pinched from above and below by connecting members 7a and 7b. On the other hand, if positions of forming connecting members 7a and 7b are shifted in the left/right direction of FIG. 2, connecting members 7a and 7b may be brought into contact with different portions on the upper and lower surfaces of plug 5. Though an example in which connecting members 7a and 7b are in direct contact with plug 5 has been described above, connecting members 7a and 7b and plug 5 may be connected indirectly with a conductive member interposed.

Figure 6:
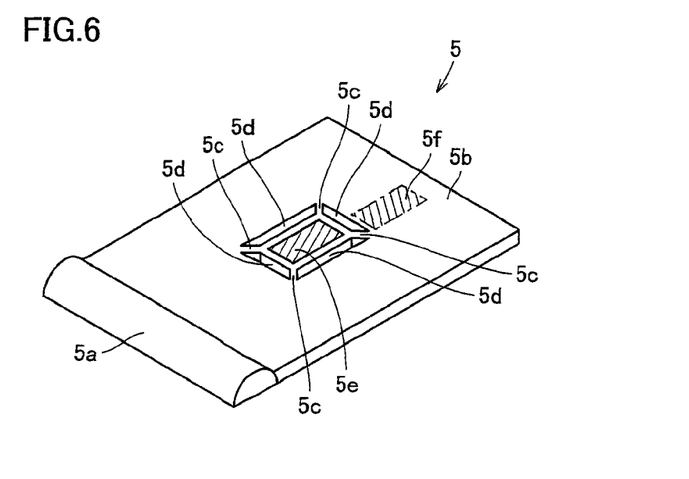
FIG. 6 is a perspective view showing an exemplary shape of the plug.

Next, an exemplary structure of plug 5 will be described with reference to FIG. 6. As shown in FIG. 6, plug 5 includes a grip portion 5a that can be gripped by one's hand and is formed of an insulator, and a body portion 5b formed of a conductive member.

As to the shape of grip portion 5a, any shape may be adopted as long as it allows gripping by hand. As to the material, any insulating material such as resin may be used.

As to the body portion 5b, it may have any shape provided that it has a conductive portion and allows electrical connection of a plurality of bipolar batteries. Typically, body portion 5b has a flat shape as shown in FIG. 6 and the like. Body portion 5b, however, may be formed by a conductive plate of any shape such as a bent plate or curved plate, or it may be formed by a conductive member of any shape such as a bar-shaped conductor or a block-shaped conductor. Further, body portion 5b may be formed by a single conductive member or by a combination of a plurality of conductive members, or by a composite material of a conductive member and an insulator.

FIG. 6 shows an example in which a fuse portion 5c is provided in body portion 5b. Fuse portion 5c, however, may be omitted. In the example of FIG. 6, a plurality of through holes 5d are provided in the plate-shaped body portion 5b to leave a narrow strip portion, and the narrow strip portion functions as the fuse portion 5c. Fuse portion 5c may be formed by other arbitrary method. For example, a relatively large through hole may be formed in body portion 5b, a separate conductive member may be placed in the through hole, the conductive member and the body portion 5b may be connected by a narrow connecting member, and the connecting member may function as the fuse portion.

When fuse portion 5c such as shown in FIG. 6 is formed, it becomes necessary to take some measure, such as shifting the contact portion between connecting members 7a and 7b and body portion 5b in a direction parallel to the upper and lower surfaces (main surfaces), rather than simply pinching body portion 5b by connecting members 7a and 7b. Specifically, portions of body portion 5b positioned on opposite sides of fuse portion 5c may be brought into contact with connecting members 7a and 7b, respectively. In the example of FIG. 6, connecting member 7a may be brought into contact with a hatched area 5e (first conductive portion), and connecting member 7b may be brought into contact with an area 5f (second conductive portion). This enables electrical connection of connecting members 7a and 7b via fuse portion 5c, and if a prescribed current or higher flows to plug 5, fuse 5c is blown off, and bipolar batteries 6a and 6b can be electrically insulated from each other.

Figure 7:
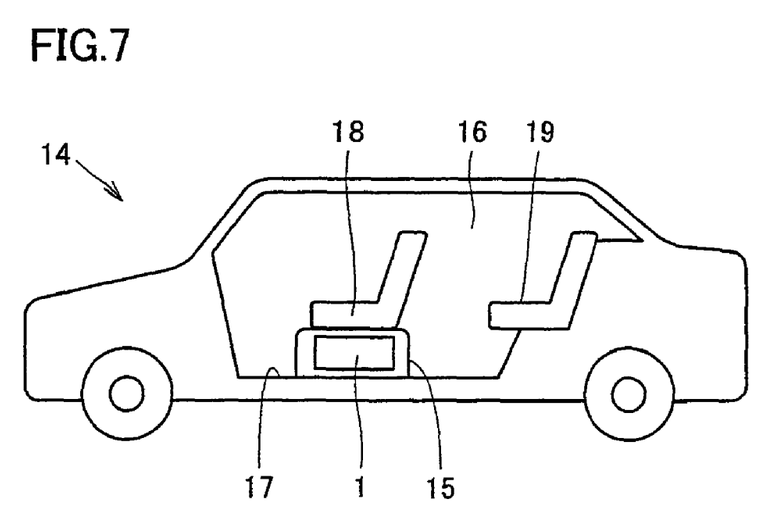
FIG. 7 is a schematic diagram showing the battery unit in accordance with an embodiment of the present invention, mounted on a vehicle.

Plug 5 shown, for example, in FIG. 6 may be fabricated by forming a plurality of through holes 5d in a plate-shaped conductive member by press working, and by providing a resin grip portion 5a thereon by, for example, insert molding. Next, an exemplary use of battery unit 1 in accordance with the present embodiment will be described. As shown in FIG.

7, battery unit 1 in accordance with the present embodiment may be mounted on a vehicle such as a car 14. The car 14 may be an electric vehicle using a rechargeable power supply as a power source, or a hybrid vehicle using an internal combustion engine such as a gasoline engine or a diesel engine and a rechargeable power supply as power sources.

As shown in FIG. 7, in a passenger space (vehicle interior) 16 of car 14, a front seat 18 and a rear seat 19 are arranged. Battery unit 1 may be arranged below front seat 18.

In the example shown in FIG. 7, battery unit 1 is surrounded by a cover 15 arranged below front seat 18 and a floor 17. It is easier to make a space for housing battery unit 1 below front seat 18 than at other portions of car 14. Further, by arranging battery unit 1 below front seat 18, it becomes possible to protect battery pack 1 against any shock, if the vehicle body is hard hit.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The present invention is effectively applicable to a battery unit formed by stacking a plurality of stacked type secondary batteries such as bipolar batteries.

The invention claimed is:

1. A battery unit, comprising:
a casing having a recess that extends into the casing between a first and a second stacked type battery contained inside the casing;
the first and second stacked type batteries including a plurality of stacked battery elements having sheet electrodes on opposite sides of an electrolyte, housed in said casing;
the first stacked type battery having a first plate-shaped collector electrode with a side facing towards the recess, wherein the first electrode has a first conductive, elastically deformable member that extends into the recess;
the second stacked type battery having a second plate-shaped collector electrode with a side facing towards the recess, wherein the second electrode has a second conductive, elastically deformable member that extends into the recess; and
a plug detachably inserted into the recess between said first and second stacked type batteries such that the plug is in contact with and electrically connecting the first and second conductive members.

2. The battery unit according to claim 1, wherein
said plug has a fuse portion and first and second conductive portions connected via said fuse portion; and
when said plug is inserted into the recess between said first and second stacked type batteries, said first conductive portion is electrically connected to said first stacked type battery and said second conductive portion is electrically connected to said second stacked type battery.

3. The battery unit according to claim 1, wherein said first and second stacked type batteries are bipolar batteries.

4. The battery unit of claim 1, wherein the plug has a hand grip portion made of an insulating material and a body portion that is electrically conductive.

5. The battery unit of claim 1, wherein the first and second conductive, elastically deformable members are each a cantilevered plate spring.

* * * * *

UNITED STATES PATENT AND TRADEMARK OFFICE
CERTIFICATE OF CORRECTION

PATENT NO. : 8,389,151 B2  
APPLICATION NO. : 12/513284  
DATED : March 5, 2013  
INVENTOR(S) : Tatematsu et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 670 days.

Signed and Sealed this

First Day of September, 2015

Michelle K. Lee
*Director of the United States Patent and Trademark Office*